H. C. ROOT.
ELLIPSOGRAPHS.
No. 181,725. Patented Aug. 29, 1876.
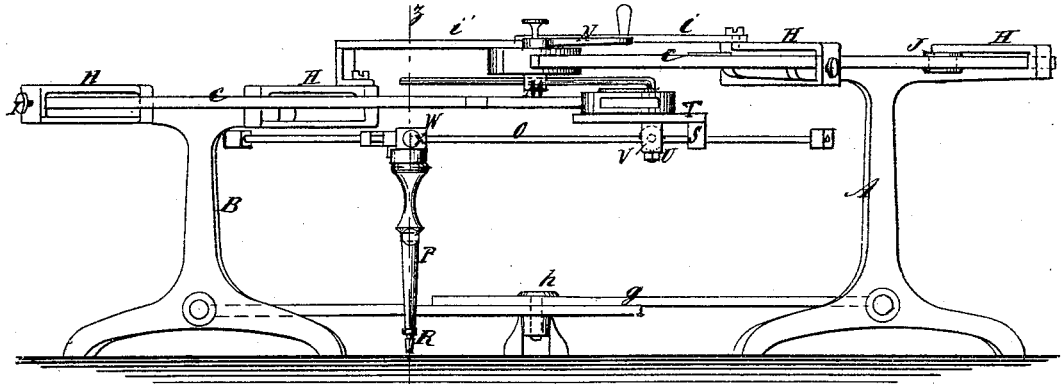
Fig. 1
Fig. 5
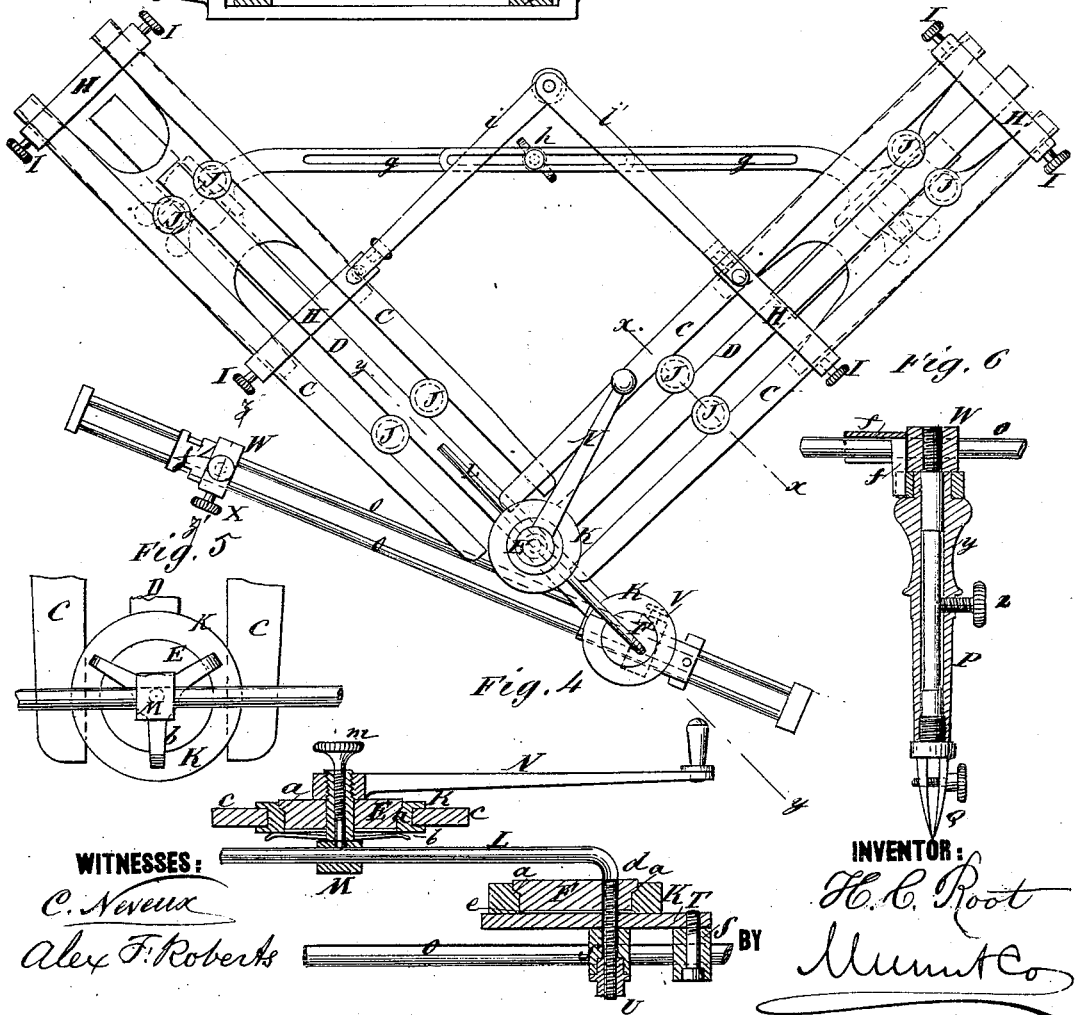
WITNESSES:
C. Neveux
Alex F. Roberts
INVENTOR:
H. C. Root
BY Munn & Co
ATTORNEYS.

UNITED STATES PATENT OFFICE.

HENRY C. ROOT, OF SAN FRANCISCO, CALIFORNIA.

IMPROVEMENT IN ELLIPSOGRAPHS.

Specification forming part of Letters Patent No. 181,725, dated August 29, 1876; application filed July 11, 1876.

*To all whom it may concern:*

Be it known that I, HENRY C. ROOT, of San Francisco, in the county of San Francisco and State of California, have invented a new and Improved Trammel, of which the following is a specification:

The invention relates to the construction and arrangement of the supports for the slides carrying the centers, and also to the construction of the centers and the pencil and pen-holder, all as hereinafter described.

Figure 1 is a side elevation of the machine. Fig. 2 is a top view. Fig. 3 is a transverse section on line $x\ x$ of Fig. 2. Fig. 4 is a section on line $y\ y$, Fig. 2. Fig. 5 is an inverted plan of a part of Fig. 4. Fig. 6 is a section of Fig. 1 on the lines $z\ z$ and $z'\ z'$, Fig. 2.

Similar letters of reference indicate corresponding parts.

A and B represent the standards for supporting the guides or ways C, in which the slides D work, which carry the centers E and F. The said guides are clamped to the tables G by yokes H, which have adjusting-screws I, for setting them and the friction-rollers J to the slides, so as to work accurately, and at the same time be sufficiently free to work without too much friction.

The centers E and F consist of disks, which are fitted in their respective slides D, by a ring, K, in which they turn freely, and in which they are fitted by the conical shoulders $a$, so as to take up any slack that may be caused by wear, and a spring, $b$, is employed, with disk E, to keep it in tight, but without too much friction. The disk F is held in place by the screw $d$, with pieces of paper under it, at $e$, one of which is to be removed from time to time as the shoulders wear at $a$.

The right-hand ways C and slide D are arranged in a higher plane than the others, so that center F may swing under them, and the two centers are connected by the crank L, which is adjustable lengthwise in the center stud M of disk E, to which the hand-crank N is connected for operating the machine.

The center F carries the sweep O, to which the stock P for the pen Q or pencil R is attached, the sweep being adjustable along the center, to which it is attached by the bearing S, plate T, and screw $d$, and it is capable of being turned on the screw $d$ by loosening the nut U, which is used to fasten it in the required position radially to said center, and the screw V fastens the sweep against sliding along the center.

The pen-stock is connected to the sweep by the spindle Y, attached to slide W, which is fastened at any point of the sweep O by the set-screw X, said stock being allowed to move up and down on the spindle to adjust itself to inequalities of the paper, and secured from dropping off said spindle by the set-screw Z.

The stock and the spindle are prevented from turning by the key $f$ projecting down from slide $f'$ into a notch in the stock.

$g$ represents extension coupling-bars, by which the two standards are detachably connected by a clamp-screw, $h$, for being set up more or less distant from each other, and for being taken apart for packing. $i$ represents stay-braces for staying the standards at the top.

By turning the crank the pen will describe an ellipse, with the long axis coinciding with the face of the standard A, and the short one in similar relation to the face of standard B.

By adjusting the centers E and F so as to coincide—that is, one above another—a true circle may be struck.

The size of the figure described by the pen will be determined by the distance between the centers F, which is regulated by the adjustable crank L and the binding-screw $m$ in the axis of crank N.

Having thus described my invention, I claim as new and desire to secure by Letters Patent—

1. The standards A B, ways C, rollers J, slides D, yokes H, and adjusting-screws I, combined and arranged substantially as specified.

2. The centers E F, rings K, cranks L N, and slides D, combined and arranged substantially as specified.

3. The centers E F, connected adjustably by the crank L, center stud M, and binding-screw m, substantially as specified.

4. The center F, crank L, screw d, plate T, bearings S, clamp-nut U, and the sweep O, combined and arranged substantially as specified.

5. The sweep O, slide W, set-screw X, stock Y, set-screw Z, and key f, combined substantially as specified.

HENRY C. ROOT.

Witnesses:
SUMNER TROTT,
TIMOTHY LYNCH.